US012594948B2

(12) United States Patent
     Hwang

(10) Patent No.: US 12,594,948 B2
(45) Date of Patent: Apr. 7, 2026

(54) APPARATUS AND METHOD FOR CONTROLLING VEHICLE MESSAGE OUTPUT

(71) Applicants: HYUNDAI MOTOR COMPANY, Seoul (KR); Kia Corporation, Seoul (KR)

(72) Inventor: Soo Joong Hwang, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 201 days.

(21) Appl. No.: 18/386,677

(22) Filed: Nov. 3, 2023

(65) Prior Publication Data

US 2024/0416941 A1     Dec. 19, 2024

(30) Foreign Application Priority Data

Jun. 13, 2023     (KR) ........................ 10-2023-0075608

(51) Int. Cl.
     *B60W 50/14*        (2020.01)
     *G10L 13/04*        (2013.01)
(52) U.S. Cl.
     CPC ............. *B60W 50/14* (2013.01); *G10L 13/04* (2013.01); *B60W 2050/143* (2013.01)

(58) Field of Classification Search
     CPC . B60W 50/14; B60W 2050/143; G10L 13/04; G10L 13/033; G10L 2015/088; G10L 15/22; G10L 13/02; G10L 13/08; G10L 2015/223; G10L 21/043; B60K 35/00; B60K 35/10; B60K 35/265
     See application file for complete search history.

(56) References Cited

U.S. PATENT DOCUMENTS

| | | | | |
|---|---|---|---|---|
| 2017/0206243 A1* | 7/2017 | Ono | .................. | G06F 16/24578 |
| 2018/0197546 A1* | 7/2018 | Kim | ........................ | G10L 17/02 |
| 2018/0308477 A1* | 10/2018 | Nagasaka | .............. | G08C 17/02 |
| 2021/0035561 A1* | 2/2021 | D'Amato | .......... | A61M 25/0662 |

* cited by examiner

*Primary Examiner* — Abby Lin
*Assistant Examiner* — Renee LaRose
(74) *Attorney, Agent, or Firm* — MORGAN, LEWIS & BOCKIUS LLP

(57)     ABSTRACT

An apparatus and method for controlling a vehicle message output. The apparatus includes an input device that receives an input of a user, and a processor that generates a guide message and controls the guide message to be output by applying an emphasis scheme set by the input of the user to a keyword when determining that the keyword exists in the guide message.

19 Claims, 7 Drawing Sheets

APPARATUS AND METHOD FOR CONTROLLING VEHICLE MESSAGE OUTPUT

CROSS-REFERENCE TO RELATED APPLICATION

This application claims the benefit of priority to Korean Patent Application No. 10-2023-0075608, filed in the Korean Intellectual Property Office on Jun. 13, 2023, the entire contents of which are incorporated herein by reference.

TECHNICAL FIELD

The present disclosure relates to an apparatus, which control the output of a guide message provided by a vehicle, and a method for controlling a vehicle message output.

BACKGROUND

Recently, when information or content provided by a vehicle is output or a function is performed to improve user convenience, a service supported by a corresponding voice is provided. In general, a message supported by a vehicle may be pre-recorded by a voice actor and then outputted, or may be generated and output through voice synthesis.

A message output from a vehicle may be composed of repeated use of similar words in order to be accurately delivered to a user, and is output with a fixed utterance rate and intonation. However, this may prevent the sound source from being quickly delivered in a situation where quick guidance is required to the user, and may cause difficulty in easily determining keywords by the user, so improvement is required.

SUMMARY

The present disclosure has been made to solve the above-mentioned problems occurring in the related art while maintaining the advantages achieved by the related art.

An aspect of the present disclosure provides an apparatus and method for controlling a vehicle message output capable of controlling an utterance speed of a message output in a vehicle to clearly deliver information to a user.

An aspect of the present disclosure provides an apparatus and method for controlling a vehicle message output capable of summarizing messages output in a vehicle or generating a short message with the same meaning and quickly delivering it to a user.

An aspect of the present disclosure provides an apparatus and method for controlling a vehicle message output capable of classifying a section in which a keyword is uttered and a section in which a keyword is not uttered in a message to change a speed for each section, change the intonation or repeatedly play the keyword section so that the keyword section is emphasized and delivered when the keyword exists in the message output in a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle message output includes an input device that receives an input of a user, and a processor that is configured to: generate a guide message, and control, when determining that a keyword exists in the guide message, the guide message to be output by applying an emphasis scheme including keyword emphasis set by the input of the user.

According to an embodiment, the processor may be configured to determine that the keyword exists in the guide message when at least one of place name, person name, driving direction information, traffic law related information, or a combination thereof is included in the guide message.

According to an embodiment, the processor may be configured to extract time information of a first section in which the keyword is uttered when determining that the keyword exists in the guide message.

According to an embodiment, the processor may be configured to classify a section in which the guide message is uttered, the section includes the first section and a second section excluding the first section.

According to an embodiment, the processor may be configured to control the first section and the second section to be output at different speeds when the emphasis scheme set by the user includes utterance speed control.

According to an embodiment, the processor may be configured to control the first section to be repeatedly output a preset number of times when the emphasis scheme set by the user includes repetitive utterance.

According to an embodiment, the processor may be configured to control the first section to be replaced with a pitch-adjusted sound source and output when the emphasis scheme set by the user includes pitch adjustment.

According to an embodiment, the processor may be configured to summarize the guide message to regenerate a summary guide message and re-output the summary guide message when determining that the guide message is requested to be re-uttered after the guide message is output.

According to an embodiment, the processor may be configured to apply changed output setting information and output the guide message when it is determined that output setting information set by the user to output the guide message is changed while the guide message is output.

According to an embodiment, the processor may be configured to control a message that checks whether to apply the changed output setting information when outputting a specified guide message to be output as an image when a number of times the output setting information is changed exceeds a threshold number of times when the specified guide message is output.

According to an embodiment, the processor may be configured to output the specified guide message by applying the changed output setting information when outputting the specified guide message when the user selects to apply the changed output setting information when outputting the specified guide message.

According to an embodiment, the processor may be configured to: set a utterance speed of the guide message to a specified speed, and control the guide message to be output at the set utterance speed when: the keyword does not exist in the guide message, and the guide message is a response to a command of the user, a number of times the guide message is generated is greater than or equal to a specified number of times, or both.

According to an embodiment, the input device may receive an input corresponding to at least one of a touch, a gesture, a voice of the user, or a combination thereof.

According to another aspect of the present disclosure, a method of controlling a vehicle message output includes generating, by a processor, a guide message, and controlling, by the processor and in response to determining that a keyword exists in the guide message, the guide message to be output by applying an emphasis scheme including keyword emphasis set by an input of a user.

According to an embodiment, the method may further include determining, by the processor, that the keyword exists in the guide message in response to at least one of place name, person name, driving direction information, traffic law related information, or a combination thereof being included in the guide message.

According to an embodiment, the method may further include extracting, by the processor and in response to the determining that the keyword exists in the guide message, time information of a section in which the keyword is uttered.

According to an embodiment, the method may further include classifying, by the processor, a section in which the guide message is uttered into a first section that is at least one section in which the keyword is uttered and a second section excluding the first section.

According to an embodiment, the method may further include controlling, by the processor, the first section and the second section to be output at different speeds when the emphasis scheme set by the user includes utterance speed control.

According to an embodiment, the input of the user may include an input corresponding to at least one of a touch, a gesture, a voice of the user, or a combination thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
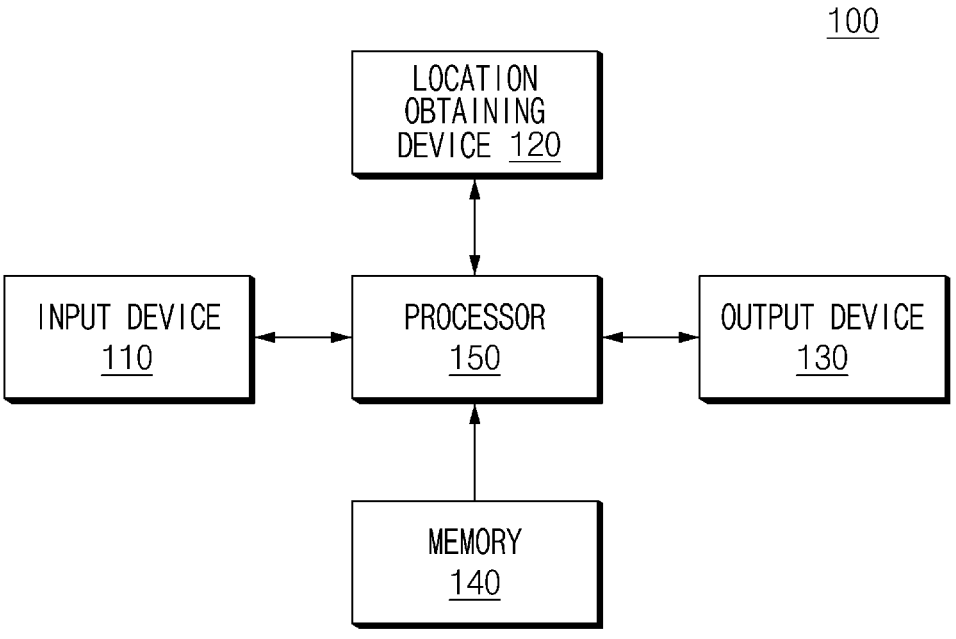
FIG. 1 is a block diagram illustrating the configuration of an apparatus for controlling a vehicle message output according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of an apparatus for controlling a vehicle message output according to an embodiment of the present disclosure.

As shown in FIG. 1, an apparatus 100 for controlling a vehicle message output may include an input device 110, a location obtaining device 120, an output device 130, a memory 140, and a processor 150.

The input device 110 may receive an input corresponding to a touch, motion (gesture), or voice of a user and transmit the received input to the processor 150. The processor 150 may control the operation of an apparatus for controlling a vehicle message output corresponding to information input by the user. According to an embodiment, the input device 110 may include at least one of a touch input device having a directionality (+ (increase) and − (decrease)), a mechanical input device, or a combination thereof. For example, the input device 110 may be arranged in one area of a steering wheel, and may be implemented such that a user may manipulate the input device 110 with a finger while holding the steering wheel. The input device 110 may be implemented as a scroll wheel, a button, a touch screen, a touch pad, a track ball, or the like that can be manipulated by a user. As another example, the input device 110 may be implemented with at least one of a motion sensor for detecting a driver's motion (gesture), a voice recognition sensor for detecting a voice, or a combination thereof.

The location obtaining device 120 may be equipped with a GPS receiving device to obtain vehicle location information, and map-match the location of a vehicle to map data stored in advance to provide a map image including road information of a certain area based on the location of the vehicle, and provide a route from a current location to a destination set by a driver.

The output device 130 may output an image or sound under control of the processor 150. According to an embodiment, the output device 130 may be implemented as a display device or a sound output device. In this case, the display device may include a HUD, a cluster, or the like, and the sound output device may include a speaker.

The memory 140 may store at least one algorithm for performing operations or executions of various commands for the operation of an apparatus for controlling a vehicle message output according to an embodiment of the present disclosure. According to an embodiment, the memory 140 may store at least one command executed by the processor 150, and the command may cause an apparatus for controlling a device of the present disclosure to operate. The memory 140 may include at least one storage medium selected from a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 150 may be implemented with various processing devices in which a semiconductor chip capable of performing operations or executions of various commands is embedded, and may control operations of an apparatus for controlling a vehicle message output according to an embodiment of the present disclosure. The processor 150 may be electrically connected to the input device 110, the location obtaining device 120, the output device 130, and the memory 140 through a wired cable or various circuits to transmit an electrical signal including a control command and the like, and may execute operations or data processing for control and/or communication. The processor 150 may include at least one of a central processing device, an application processor, a communication processor (CP), or a combination thereof.

The processor 150 may generate a guide message. In this case, the guide message may include information for guiding the vehicle on a set route to a destination, road information included in the route, and a message corresponding to accident information. In addition, the guide message may include a message corresponding to a response to a user's command and may include a message corresponding to vehicle state information changed according to a user's manipulation. In addition, the guide message may include news, weather, and messages corresponding to mobile phone message contents. According to an embodiment, the processor 150 may generate a guide message as a text sentence broken down into phoneme units.

The processor 150 may determine whether a guide message summary is set by a user. When it is determined that the guide message summary is set by the user, the processor 150 may omit post-positions (subject case marker or object case marker) or predicates in the guide message such that only essential content is delivered to the user, and summarize the guide message by replacing it with a short word having the same meaning. For example, when generating "Turn left in a moment" as a guide message, the processor 150 may summarize the guide message as "Turn left soon". As another example, when "After a while, take the third lane and drive to the side of the underpass" is generated as a guide message, the processor 150 may summarize the guide message as "Take the third lane and go to the road next to the underpass".

When the guide message summary is set by the user, the processor 150 may summarize the guide message and then generate an audio sound source obtained by synthesizing the summarized guide message into an audible voice message through a voice synthesizer. Meanwhile, when the summary of the guide message is not set by the user, the processor 150 may generate an audio sound source obtained by synthesizing the guide message into a voice message.

The processor 150 may determine whether a change in utterance speed of the guide message is set by the user when an audio sound source obtained by synthesizing the guide message is generated.

When it is determined that the change in utterance speed of the guide message is not set, the processor 150 may control the audio sound source obtained by synthesizing the guide message into a voice message to be output as it is.

Meanwhile, the processor 150 may determine whether a keyword exists in the guide message when it is determined that the change in utterance speed of the guide message is set by the user. In this case, the keyword may include at least one of place name, person name, driving direction information, traffic law related information, or a combination thereof. For example, traffic law related information may include road speed limit information, average speed information in a section control section, child/elderly protection area information, accident black spot information, and the like.

When it is determined that any keywords do not exist in the guide message, the processor 150 may set an utterance speed and convert all sound sources of the guide message at the set utterance speed.

According to an embodiment, when it is determined that the keyword does not exist in the guide message, the processor 150 may determine whether the number of times the same guide message is generated is equal to or greater than a specified number of times. In addition, the processor 150 may determine whether the guide message includes contents responsive to the user command.

According to an embodiment, the processor 150 may count the number of times the same guide message is generated, and determine whether the cumulative count number is greater than or equal to a specified number of times. In addition, when a user's command is input immediately before generating a guide message, the processor 150 may determine that the guide message includes content responsive to the user's command. For example, when generating a guide message such as "Please say it again", "Turn on the air conditioner", or the like, the processor 150 may determine that the content responsive to the user command is included.

When it is determined that the number of times the same guide message is generated is equal to or greater than a specified number of times, the processor 150 may apply a specified utterance speed to the guide message. In addition, the processor 150 may apply a specified utterance speed to the guide message when the guide message includes content responsive to a user command. In this case, the specified utterance speed may be set to 1.1 times to 1.2 times the speed set in advance. The processor 150 may convert all sound sources of the guide message at a specified utterance speed.

Meanwhile, when it is determined that the keyword exists in the guide message, the processor 150 may determine whether the emphasis scheme for emphasizing the keyword is set by the user.

When it is determined that the emphasis scheme for emphasizing the keyword is not set by the user, the processor 150 may set the utterance speed for all sound sources of the guide message and output the guide message at the set utterance speed.

Meanwhile, when it is determined that the emphasis scheme for emphasizing the keyword is set by the user, the processor 150 may extract time information of a section in which the keyword is uttered. According to an embodiment, the processor 150 may classify a section in which a guide message is uttered into a first section, which is at least one section in which a keyword is uttered, and a second section excluding the first section. In addition, time information of the first section may be extracted. According to an embodiment, the processor 150 may extract time information of the first section based on phoneme-unit time alignment information output from the voice synthesizer. As an example, when "Left turn in the direction of Sang-il IC after a while" is generated as a guide message, the processor 150 may extract the time information of the first section as 0.13 s to 0.22 s and 0.41 s to 0.55 s.

When the time information of the first section is extracted, the processor 150 may apply the emphasis scheme to the first section.

According to an embodiment, the processor 150 may control the first section and the second section to be output at different speeds when the utterance speed is controlled in the emphasis scheme set by the user. According to an embodiment, the processor 150 may control the first section to be converted at a specified speed, and may control the second section to be converted at a higher utterance speed than the first section. In this case, the specified speed may be set to a speed set in advance or higher at which the guide message is uttered. For example, when "Turn left in a while" is generated as a guide message, the processor 150 may control "Turn left" to be changed at a specified speed, and control "in a while" to be changed at a speed higher than the specified speed. When "Speed bumps are continuous in front" is generated as a guide message, the processor 150 may control "speed bumps" to be converted at a specified speed, and control "ahead, this is continuous" to be converted at a speed higher than the specified speed. When the processor 150 generates "After a while, take the third lane and drive on the road next to the underpass" as a guide message, the processor 150 may control "The third lane, the road next to the underpass" to be converted at a specified speed, and control "After a while, ride on, drive with" to be converted at a speed higher than a specified speed.

According to an embodiment, the processor 150 may convert the guide message such that the first section is repeated a preset number of times when the emphasis scheme set by the user is repetition utterance. According to an embodiment, the processor 150 may convert the first section to be repeated twice. For example, when "Turn left in a while" is generated as a guide message, the processor 150 may convert "Turn left" to "Turn left in a moment, turn left" so that "Turn left" is repeated twice. As another example, when the processor 150 generates "After a while, take the third lane and drive on the road next to the underpass" as a guide message, the processor 150 may convert it to "Go to the third lane, the third lane, then go to the road next to the underpass".

According to an embodiment, the processor 150 may control to replace and output the sound source of the first section with a pitch-adjusted sound source when the emphasis scheme set by the user is pitch control. According to an embodiment, the processor 150 may generate a pitch-adjusted sound source by utilizing a pitch conversion algorithm.

The processor 150 may control to output through the output device 130 the guide message to which the emphasis scheme is applied to the first section.

According to an embodiment of the present disclosure, the processor 150 may determine whether there is a re-utterance request by the user after the guide message is output. When it is determined that there is a re-utterance request by the user, the processor 150 may further summarize the output guide message. For example, after outputting a guide message saying "I will inform you of major news at this time" through the output device 130, when it is determined that there is a re-utterance request by the user, the processor 150 may summarize the guide message as "I will inform you of the current news". In addition, the processor 150 may control to re-output the additionally summarized guide message through the output device 130.

According to another embodiment of the present disclosure, the processor 150 may determine whether there is a user input for changing output setting information while a guide message is output. According to an embodiment, when it is determined that there is a user input for changing the output setting information while the guide message is output through the output device 130, the processor 150 applies the changed output setting information corresponding to the user input. It can be controlled to output a guide message.

For example, the processor 150 may stop outputting a guide message through the output device 130 when there is a user's input for preventing a guide message from being received while the guide message is output through the output device 130. In addition, the processor 150 may control to adjust and output the volume when there is a user input for adjusting the volume at which the guide message is output. In addition, the processor 150 may control to adjust and output the utterance speed when there is a user input for adjusting the utterance speed of the guide message.

In this case, the user input may include an input corresponding to a touch, motion (gesture) or voice of a user. Accordingly, the processor 150 may improve user convenience by allowing the output setting information of the guide message to be changed with only a user's simple input for changing the output setting information while the guide message is output.

According to an embodiment, when the processor 150 is scheduled to output a specified guide message and the user changes the output setting information for the specified guide message, the processor 150 may determine whether the number of times the output setting information is changed for the specified guide message exceeds the threshold number of times.

When it is determined that the user changes the output setting information for a specified guide message, and the number of times the output setting information is changed for the specified guide message exceeds a threshold number of times, the processor 150 may output, in a form of an image, a message for confirming whether to apply the changed output setting information when outputting a specified guide message.

The processor 150 may determine whether the user selects the application of the changed output setting information when outputting a specified guide message. When it is determined that the user selects the application of the changed output setting information when outputting the specified guide message, the processor 150 may control the specified guide message to be output by applying the changed output setting information when outputting the specified guide message.

When it is determined that the changed output setting information is not applied when the user outputs a specified guide message, the processor 150 may determine whether the output setting information is changed by determining whether there is a user input for changing the output setting information.

FIGS. 2 to 6 are diagrams illustrating a method of controlling a vehicle message output according to an embodiment of the present disclosure.

Figure 2:
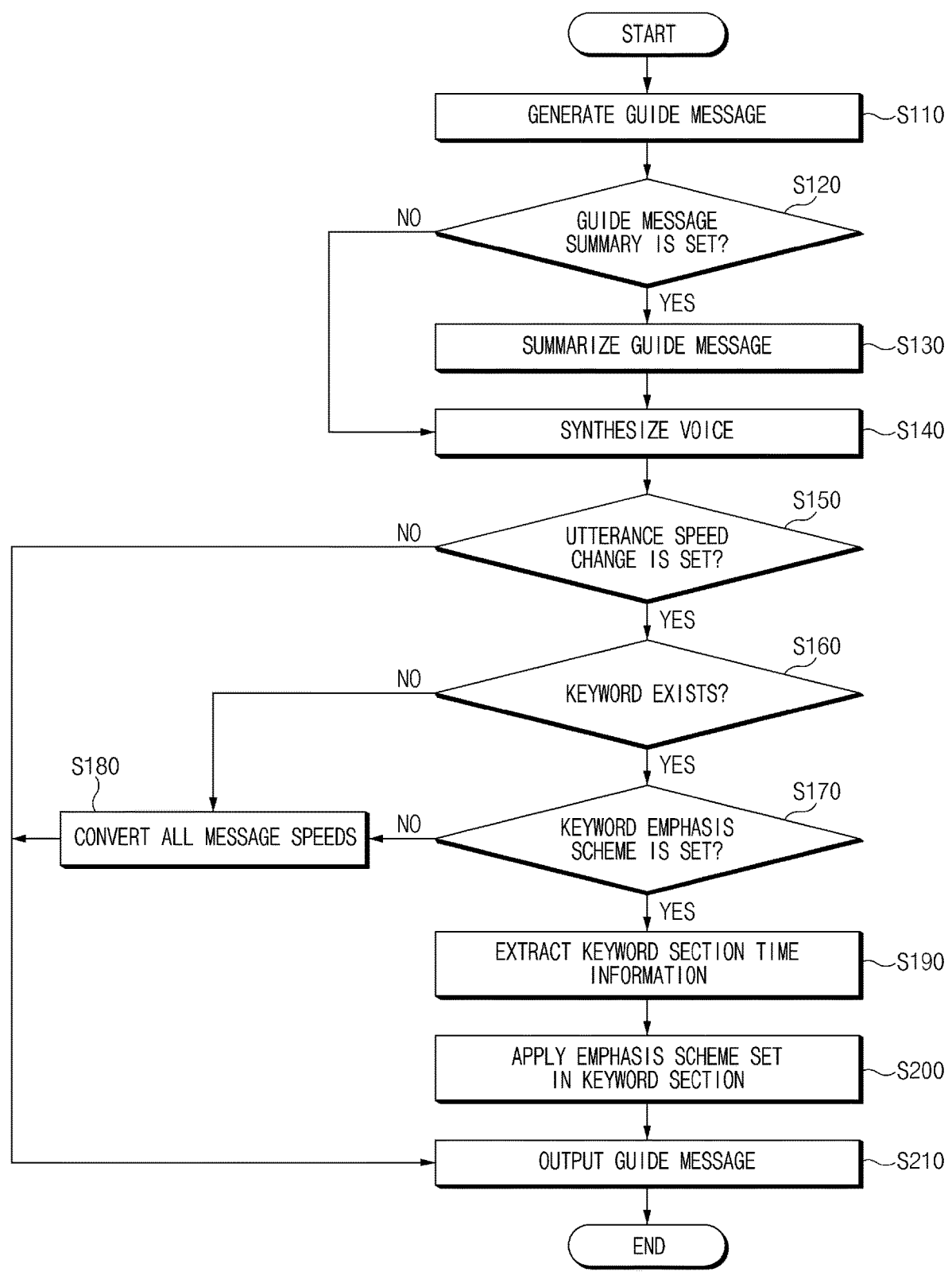
FIGS. 2 to 6 are diagrams illustrating a method of controlling a vehicle message output according to an embodiment of the present disclosure.

As shown in FIG. 2, in S110, the processor 150 may generate a guide message. In this case, the guide message may include information for guiding the vehicle on a set route to a destination, road information included in the route, and a message corresponding to accident information. In addition, the guide message may include a message corresponding to a response to a user's command and may include a message corresponding to vehicle state information changed according to a user's manipulation. In addition, the guide message may include news, weather, and messages corresponding to mobile phone message contents. According to an embodiment, the processor 150 may generate a guide message as a text sentence broken down into phoneme units.

In S120, the processor 150 may determine whether a guide message summary is set by a user.

When it is determined in S120 that the guide message summary is set by the user, in S130, the processor 150 may omit post-positions (subject case marker or object case marker) or predicates in the guide message such that only essential content is delivered to the user, and summarize the guide message by replacing it with a short word having the same meaning. For example, when generating "Turn left in a moment" as a guide message, the processor 150 may summarize the guide message as "Turn left soon". As another example, when "After a while, take the third lane and drive to the side of the underpass" is generated as a guide message, the processor 150 may summarize the guide message as "Take the third lane and go to the road next to the underpass".

When the guide message summary is set by the user, in S140, the processor 150 may summarize the guide message and then generate an audio sound source obtained by synthesizing the summarized guide message into an audible voice message through a voice synthesizer. Meanwhile, when the summary of the guide message is not set by the user, the processor 150 may generate an audio sound source obtained by synthesizing the guide message into a voice message.

In S150, the processor 150 may determine whether a change in utterance speed of the guide message is set by the user when an audio sound source obtained by synthesizing the guide message is generated.

When it is determined in S150 that the change in utterance speed of the guide message is not set, the processor 150 may control the audio sound source obtained by synthesizing the guide message into a voice message to be output as it is.

Meanwhile, in S160, the processor 150 may determine whether a keyword exists in the guide message when it is determined that the change in utterance speed of the guide message is set by the user. In this case, the keyword may include at least one of place name, person name, driving direction information, traffic law related information, or a combination thereof. For example, traffic law related information may include road speed limit information, average speed information in a section control section, child/elderly protection area information, accident black spot information, and the like.

When it is determined in S160 that any keywords do not exist in the guide message, in S180, the processor 150 may set an utterance speed and convert all sound sources of the guide message at the set utterance speed. As another embodiment, a case where the keyword does not exist will be described with reference to FIG. 3.

Meanwhile, when it is determined in S160 that the keyword exists in the guide message, in S170, the processor 150 may determine whether the emphasis scheme for emphasizing the keyword is set by the user.

When it is determined in S170 that the emphasis scheme for emphasizing the keyword is not set by the user, in S180, the processor 150 may set the utterance speed for all sound sources of the guide message and convert all sound sources of the guide message at the set utterance speed.

Meanwhile, when it is determined in S170 that the emphasis scheme for emphasizing the keyword is set by the user, in S190, the processor 150 may extract time information of a section in which the keyword is uttered. According to an embodiment, the processor 150 may classify a section in which a guide message is uttered into a first section, which is at least one section in which a keyword is uttered, and a second section excluding the first section. In addition, time information of the first section may be extracted. According to an embodiment, the processor 150 may extract time information of the first section based on phoneme-unit time alignment information output from the voice synthesizer. As an example, when "Left turn in the direction of Sang-il IC after a while" is generated as a guide message, the processor 150 may extract the time information of the first section as 0.13 s to 0.22 s and 0.41 s to 0.55 s.

When the time information of the first section is extracted, in S200, the processor 150 may apply the emphasis scheme to the first section.

According to an embodiment, in S200, the processor 150 may control the first section and the second section to be output at different speeds when the utterance speed is controlled in the emphasis scheme set by the user. According to an embodiment, the processor 150 may control the first section to be converted at a specified speed, and may control the second section to be converted at a higher utterance speed than the first section. In this case, the specified speed may be set to a speed set in advance or higher at which the guide message is uttered. For example, when "Turn left in a while" is generated as a guide message, the processor 150 may control "Turn left" to be changed at a specified speed, and control "in a while" to be changed at a speed higher than the specified speed. When "Speed bumps are continuous in front" is generated as a guide message, the processor 150 may control "speed bumps" to be converted at a specified speed, and control "Ahead, this is continuous" to be converted at a speed higher than the specified speed. When the processor 150 generates "After a while, take the third lane and drive on the road next to the underpass" as a guide message, the processor 150 may control "The third lane, the road next to the underpass" to be converted at a specified speed, and control "After a while, ride on, drive with" to be converted at a speed higher than a specified speed.

According to an embodiment, in S200, the processor 150 may convert the guide message such that the first section is repeated a preset number of times when the emphasis scheme set by the user is repetition utterance. According to an embodiment, the processor 150 may convert the first section to be repeated twice. For example, when "Turn left in a while" is generated as a guide message, the processor 150 may convert "Turn left" to "Turn left in a moment, turn left" so that "Turn left" is repeated twice. As another example, when the processor 150 generates "After a while, take the third lane and drive on the road next to the underpass" as a guide message, the processor 150 may convert it to "Go to the third lane, the third lane, then go to the road next to the underpass".

According to an embodiment, in S200, the processor 150 may control to replace and output the sound source of the first section with a pitch-adjusted sound source when the emphasis scheme set by the user is pitch control. According to an embodiment, the processor 150 may generate a pitch-adjusted sound source by utilizing a pitch conversion algorithm.

In S210, the processor 150 may control to output through the output device 130 the guide message to which the emphasis scheme is applied to the first section.

Figure 3:
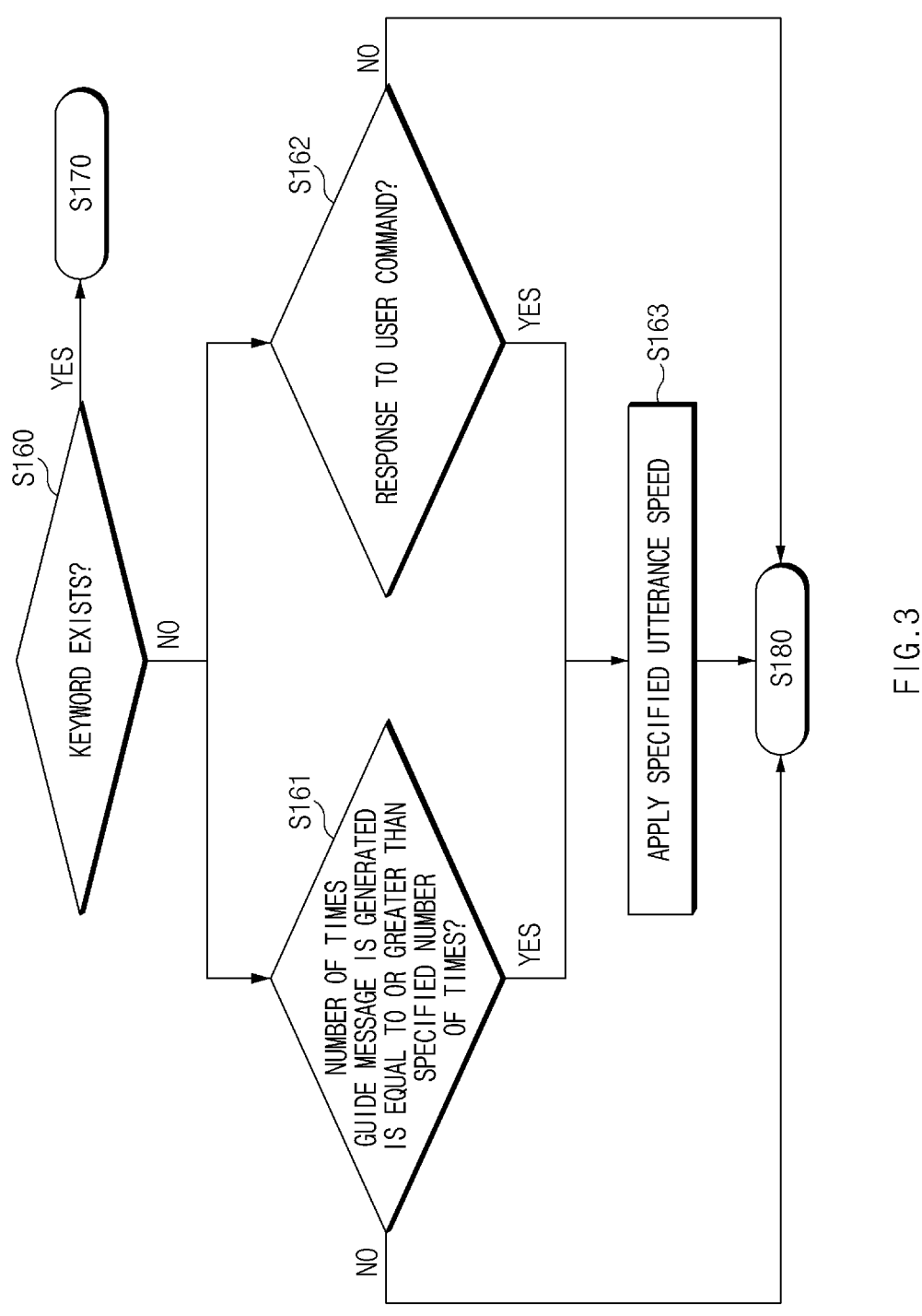

As shown in FIG. 3, when it is determined in S160 that the keyword does not exist in the guide message, in S161, the processor 150 may determine whether the number of times the same guide message is generated is equal to or greater than a specified number of times. In addition, in S162, the processor 150 may determine whether the guide message includes contents responsive to the user command.

According to an embodiment, in S161, the processor 150 may count the number of times the same guide message is generated, and determine whether the cumulative count number is greater than or equal to a specified number of times. In addition, in S162, when a user's command is input immediately before generating a guide message, the processor 150 may determine that the guide message includes content responsive to the user's command. For example, when generating a guide message such as "Please say it again", "Turn on the air conditioner", or the like, the processor 150 may determine that the content responsive to the user command is included.

When it is determined in S161 that the number of times the same guide message is generated is equal to or greater than a specified number of times, the processor 150 may apply a specified utterance speed to the guide message. In addition, when the guide message includes the content responsive to a user command in S162, the processor 150 may apply a specified utterance speed to the guide message in S163. In this case, the specified utterance speed may be set to 1.1 times to 1.2 times the speed set in advance. In S180, the processor 150 may convert all sound sources of the guide message at a specified utterance speed.

Figure 4:
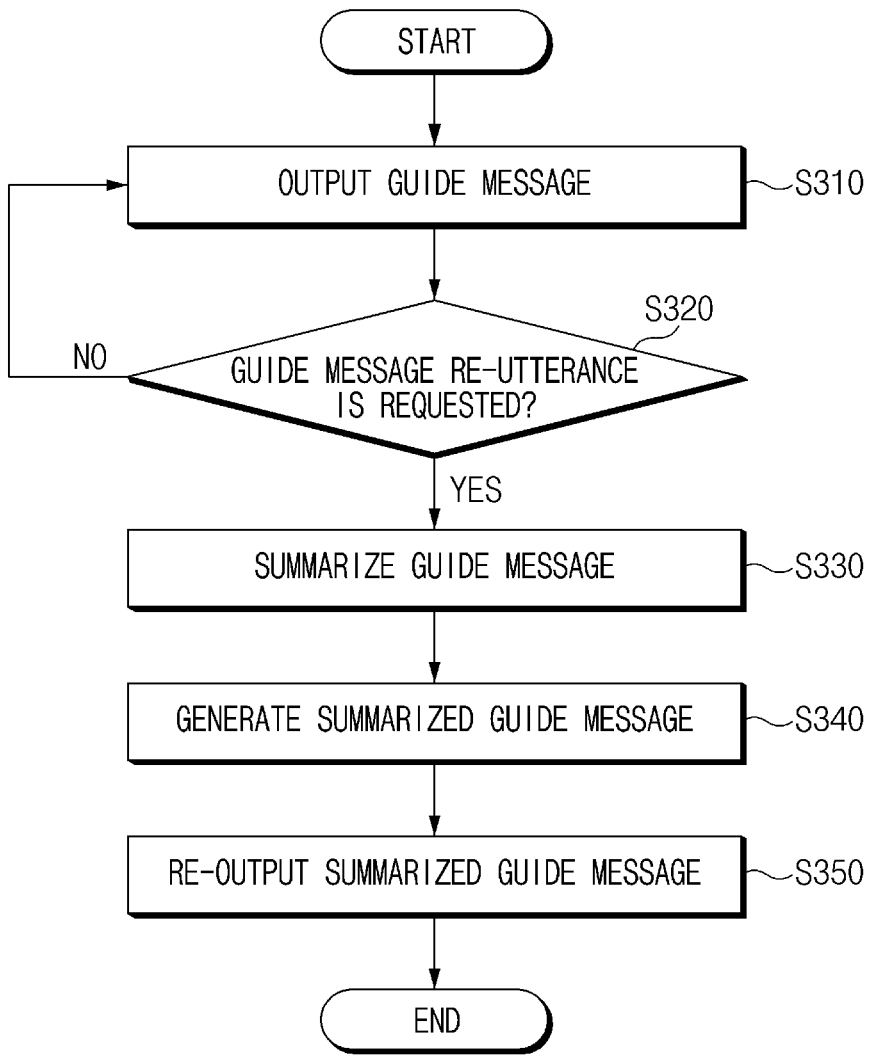

As shown in FIG. 4, in S320, the processor 150 may determine whether there is a re-utterance request by the user after the guide message is output in S310.

When it is determined in S320 that there is a re-utterance request by the user, in S330, the processor 150 may further summarize the output guide message.

For example, after outputting a guide message saying "I will inform you of major news at this time" through the output device 130, when it is determined that there is a re-utterance request by the user, in S340, the processor 150 may summarize the guide message as "I will inform you of the current news". In addition, in S350, the processor 150 may control to re-output the additionally summarized guide message through the output device 130.

Figure 5:
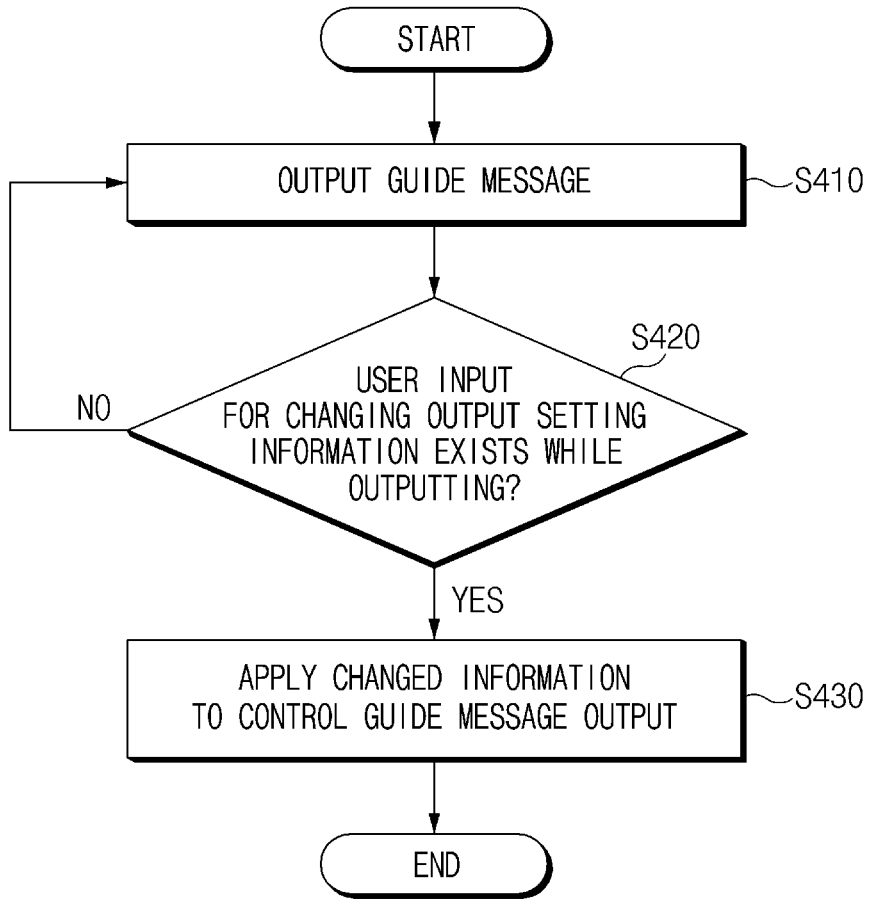

As shown in FIG. 5, in S420, the processor 150 may determine whether there is a user input for changing output setting information while a guide message is output in S410. According to an embodiment, when it is determined that there is a user input for changing the output setting information while the guide message is output through the output device 130, in S430, the processor 150 applies the changed output setting information corresponding to the user input. It can be controlled to output a guide message.

For example, in S430, the processor 150 may stop outputting a guide message through the output device 130 when there is a user's input for preventing a guide message from being received while the guide message is output through the output device 130. In addition, in S430, the processor 150 may control to adjust and output the volume when there is a user input for adjusting the volume at which the guide message is output. In addition, in S430, the processor 150 may control to adjust and output the utterance speed when there is a user input for adjusting the utterance speed of the guide message in S420.

In this case, the user input may include an input corresponding to a touch, motion (gesture) or voice of a user. Accordingly, the processor 150 may improve user convenience by allowing the output setting information of the guide message to be changed with only a user's simple input for changing the output setting information while the guide message is output.

Figure 6:
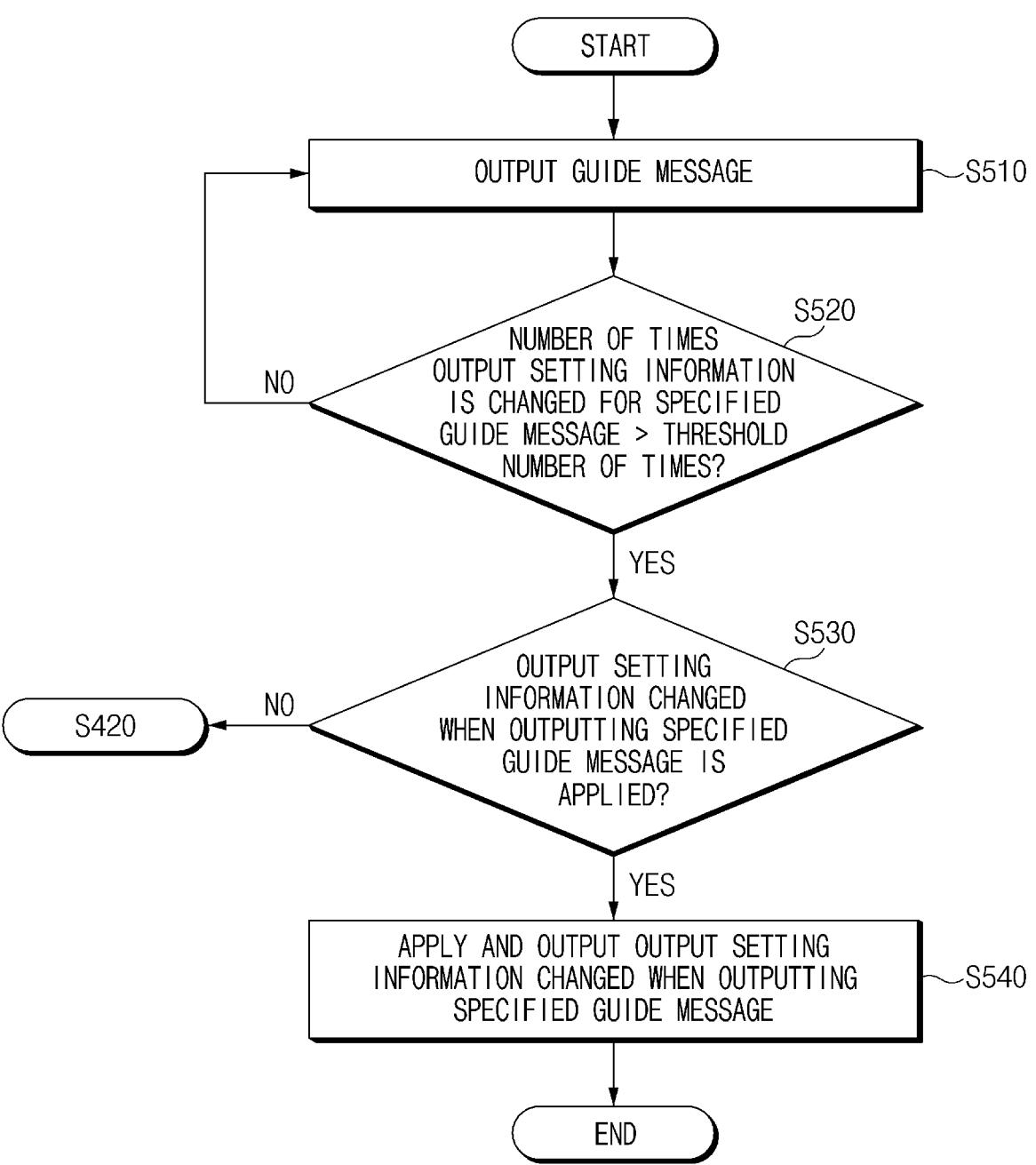

As shown in FIG. 6, when the processor 150 is scheduled to output a specified guide message in S510, and the user changes the output setting information for the specified guide message, in S520, the processor 150 may determine whether the number of times the output setting information is changed for the specified guide message exceeds the threshold number of times.

When it is determined that the user changes the output setting information for a specified guide message, and the number of times the output setting information is changed for the specified guide message exceeds a threshold number of times, the processor 150 may output, in a form of an image, a message for confirming whether to apply the changed output setting information when outputting a specified guide message.

In S530, the processor 150 may determine whether the user selects the application of the changed output setting information when outputting a specified guide message.

When it is determined in S530 that the user selects the application of the changed output setting information when outputting the specified guide message, in S540, the processor 150 may control the specified guide message to be output by applying the changed output setting information when outputting the specified guide message.

When it is determined in S530 that the user does not apply the output setting information changed when a guide message of "Error! hyperlink reference is incorrect" is output, the processor 150 may perform S420 to determine whether the output setting information is changed.

Figure 7:
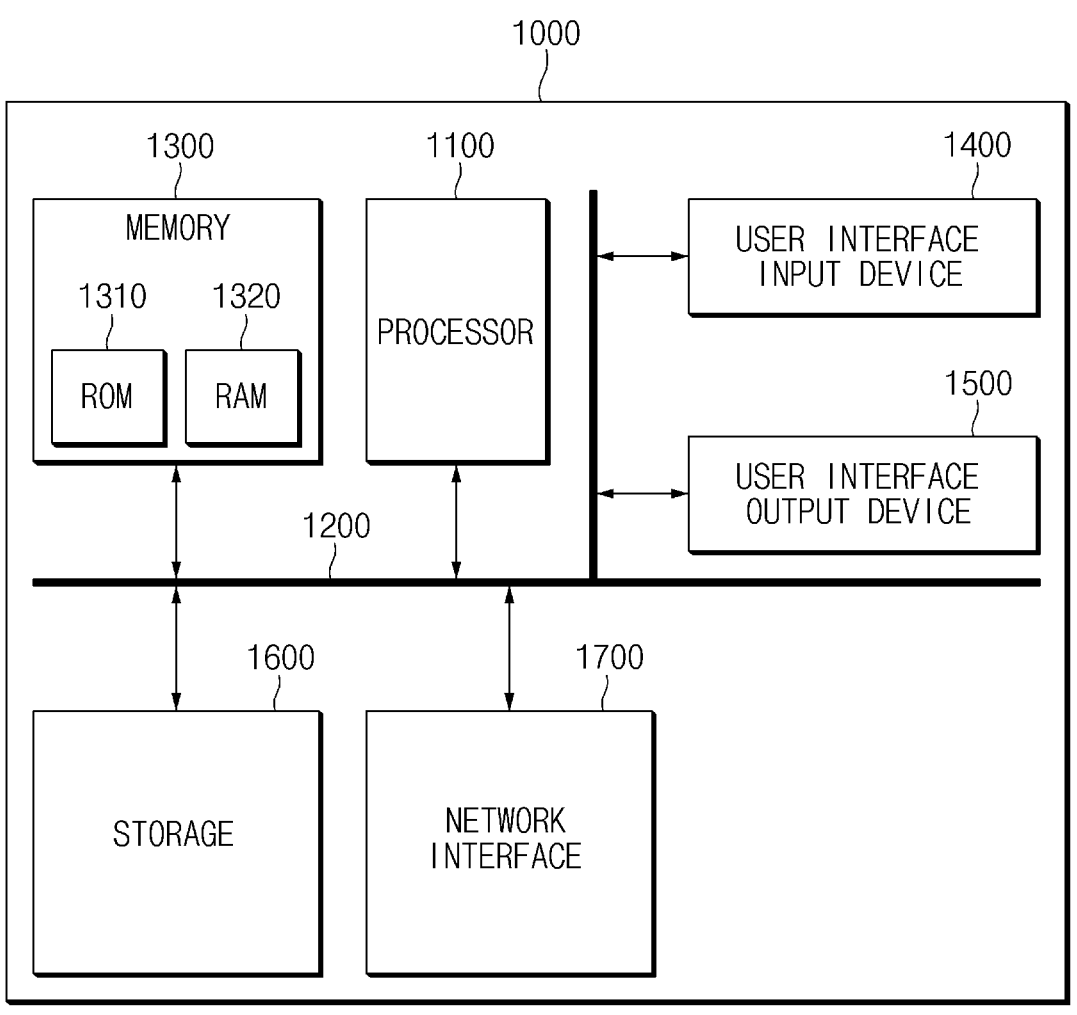
FIG. 7 is a block diagram illustrating a computing system according to an embodiment of the present disclosure.

FIG. 7 is a block diagram illustrating a computing system according to an embodiment of the present disclosure.

Referring to FIG. 7, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method for controlling a vehicle message output according to the embodiments may control an utterance speed of a message output in a vehicle to clearly deliver information to a user.

The apparatus and method for controlling a vehicle message output: according to the embodiments may summarize messages output in a vehicle or generate a short message with the same meaning and quickly deliver it to a user.

The apparatus and method for controlling a vehicle message output according to the embodiments may classify a section in which a keyword is uttered and a section in which a keyword is not uttered in a message to change a speed for each section, change the intonation or repeatedly play the keyword section so that the keyword section is emphasized and delivered when the keyword exists in the message output in a vehicle.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a vehicle message output, the apparatus comprising:
an input device configured to receive an input, including information on emphasis scheme applied to keyword of a guide message, from a user; and
a processor configured to:
generate the guide message, and
control to output the guide message by applying the emphasis scheme set by the information, to a first section including the keyword, based on whether the keyword exists in the guide message.

2. The apparatus of claim 1, wherein the processor is configured to determine that the keyword exists in the guide message when at least one of place name, person name, driving direction information, traffic law related information, or a combination thereof is included in the guide message.

3. The apparatus of claim 1, wherein the processor is configured to extract time information of the first section in which the keyword is uttered when determining that the keyword exists in the guide message.

4. The apparatus of claim 3, wherein the processor is configured to classify a section in which the guide message is uttered, and the section includes the first section and a second section excluding the first section.

5. The apparatus of claim 4, wherein the processor is configured to control the first section and the second section to be output at different speeds when the emphasis scheme set by the user includes utterance speed control.

6. The apparatus of claim 4, wherein the processor is configured to control the first section to be repeatedly output a preset number of times when the emphasis scheme set by the user includes repetitive utterance.

7. The apparatus of claim 4, wherein the processor is configured to control the first section to be replaced with a pitch-adjusted sound source and output when the emphasis scheme set by the user includes pitch adjustment.

8. The apparatus of claim 1, wherein the processor is configured to summarize the guide message to regenerate a summary guide message and re-output the summary guide message when determining that the guide message is requested to be re-uttered after the guide message is output.

9. The apparatus of claim 1, wherein the processor is configured to apply changed output setting information and output the guide message when it is determined that output setting information set by the user to output the guide message is changed while the guide message is output.

10. The apparatus of claim 9, wherein the processor is configured to control a message that checks whether to apply the changed output setting information when outputting a specified guide message to be output as an image when a number of times the output setting information is changed exceeds a threshold number of times when the specified guide message is output.

11. The apparatus of claim 10, wherein the processor is configured to output the specified guide message by applying the changed output setting information when outputting the specified guide message when the user selects to apply the changed output setting information when outputting the specified guide message.

12. The apparatus of claim 1, wherein the processor is configured to:
set a utterance speed of the guide message to a specified speed, and
control the guide message to be output at the set utterance speed when:
the keyword does not exist in the guide message, and
the guide message is a response to a command of the user, a number of times the guide message is generated is greater than or equal to a specified number of times, or both.

13. The apparatus of claim 1, wherein the input device is configured to receive an input corresponding to at least one of a touch, a gesture, a voice of the user, or a combination thereof.

14. A method of controlling a vehicle message output, the method comprising:
receiving an input, including information on emphasis scheme applied to keyword of a guide message, of from a user;
generating, by a processor, a guide message; and
controlling, by the processor, the guide message to be output by applying the emphasis scheme set by the information, to a first section including the keyword, based on whether keyword exists in the guide message.

15. The method of claim 14, further comprising:
determining, by the processor, that the keyword exists in the guide message in response to at least one of place name, person name, driving direction information, traffic law related information, or a combination thereof being included in the guide message.

16. The method of claim 14, further comprising:
extracting, by the processor and in response to the determining that the keyword exists in the guide message, time information of the first section in which the keyword is uttered.

17. The method of claim 16, further comprising:
classifying, by the processor, a section in which the guide message is uttered into a first section that is at least one section in which the keyword is uttered and a second section excluding the first section.

18. The method of claim 17, further comprising:
controlling, by the processor, the first section and the second section to be output at different speeds when the emphasis scheme set by the user includes utterance speed control.

19. The method of claim 14, wherein the input of the user includes an input corresponding to at least one of a touch, a gesture, a voice of the user, or a combination thereof.

* * * * *